(12) United States Patent
Hanel et al.

(10) Patent No.: US 10,112,775 B2
(45) Date of Patent: Oct. 30, 2018

(54) CONVEYOR SYSTEM, OPERATING SYSTEM USING CONVEYOR SYSTEM, AND METHOD

(71) Applicants: Justin R. Hanel, Montgomery, TX (US); Jeremy L. Weinstein, Tomball, TX (US)

(72) Inventors: Justin R. Hanel, Montgomery, TX (US); Jeremy L. Weinstein, Tomball, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 15/168,492

(22) Filed: May 31, 2016

(65) Prior Publication Data

US 2017/0341865 A1    Nov. 30, 2017

(51) Int. Cl.
| | |
|---|---|
| *B65G 21/08* | (2006.01) |
| *B65G 21/14* | (2006.01) |
| *B65G 15/08* | (2006.01) |
| *B65G 15/60* | (2006.01) |

(52) U.S. Cl.
CPC ............ *B65G 15/08* (2013.01); *B65G 15/60* (2013.01); *B65G 21/08* (2013.01); *B65G 21/14* (2013.01); *B65G 2201/04* (2013.01)

(58) Field of Classification Search
CPC ...... B65G 15/08; B65G 21/2045; E21B 43/00
USPC ............... 198/315, 812, 860.3, 860.4, 860.5; 166/308.1
See application file for complete search history.

(56) References Cited

U.S. PATENT DOCUMENTS

| | | | | |
|---|---|---|---|---|
| 3,212,628 A | * | 10/1965 | Massey | B65G 43/00 198/311 |
| 3,598,224 A | | 8/1971 | Oury | |
| 3,684,255 A | | 8/1972 | Rossi | |
| 4,915,505 A | * | 4/1990 | Arribau | B01F 5/0057 366/136 |
| 5,052,545 A | * | 10/1991 | Gongen | B65G 15/08 198/534 |

(Continued)

FOREIGN PATENT DOCUMENTS

| | | |
|---|---|---|
| EP | 0424591 A1 | 5/1991 |
| EP | 1582482 A2 | 10/2005 |
| WO | 2004054904 A1 | 7/2004 |

OTHER PUBLICATIONS

U.S. 2002/0175055 A1, Ryde, Nov. 28, 2002.*

(Continued)

*Primary Examiner* — Douglas A Hess
(74) *Attorney, Agent, or Firm* — Cantor Colburn LLP

(57) ABSTRACT

A conveyor system includes a looped belt and a conveying portion cover. The belt has a conveying portion and a retreating portion movable through the conveyor system, each of the conveying portion and the retreating portion having an interior surface and an exterior surface, the exterior surface of the conveying portion configured to convey materials. The conveying portion of the belt is disposed within the conveying portion cover, the retreating portion of the belt disposed exteriorly of the conveying portion cover, and the conveying portion cover has a convex sliding surface and a tubular shape. The interior surface of the conveying portion of the belt is slidable along the sliding surface of the conveying portion cover.

19 Claims, 8 Drawing Sheets

(56) References Cited

U.S. PATENT DOCUMENTS

| | | | |
|---|---|---|---|
| 5,067,867 A | 11/1991 | Ruder et al. | |
| 5,129,508 A * | 7/1992 | Shelstad | B65G 21/2081 |
| | | | 198/836.1 |
| 5,246,102 A | 9/1993 | Rappen et al. | |
| 5,498,119 A | 3/1996 | Faivre | |
| 6,170,644 B1 * | 1/2001 | Nakaegawa | B65G 15/60 |
| | | | 198/811 |
| 6,378,686 B1 * | 4/2002 | Mayer | B65G 21/14 |
| | | | 198/311 |
| 6,405,855 B1 * | 6/2002 | Peltier | B65G 15/08 |
| | | | 198/819 |
| 6,675,958 B2 * | 1/2004 | Kaeb | B65G 15/08 |
| | | | 198/819 |
| 6,805,229 B2 | 10/2004 | Dekoning | |
| 6,929,113 B1 | 8/2005 | Hoover et al. | |
| 7,416,075 B2 | 8/2008 | Haustein et al. | |
| 7,448,486 B1 | 11/2008 | Frankl et al. | |
| 7,455,173 B1 | 11/2008 | Fridman et al. | |
| 7,909,153 B2 * | 3/2011 | Pogue | B65G 21/14 |
| | | | 198/312 |
| 8,083,047 B1 * | 12/2011 | Hermann | B65G 21/14 |
| | | | 198/313 |
| 8,221,047 B2 * | 7/2012 | Petersen | A01C 15/003 |
| | | | 198/312 |
| 8,424,784 B1 * | 4/2013 | Munisteri | E21B 43/267 |
| | | | 241/21 |
| 8,770,390 B2 * | 7/2014 | Neufeld | B65G 21/14 |
| | | | 198/812 |
| 9,096,376 B1 * | 8/2015 | Wood | B65G 15/64 |
| 2004/0031662 A1 | 2/2004 | Dekoning | |
| 2006/0175180 A1 | 8/2006 | Smith et al. | |
| 2012/0006658 A1 | 1/2012 | Hermann et al. | |

OTHER PUBLICATIONS

"Pilers and Conveyors"; Milestone; 2016; Internet; www.milestone-equipment.com/pilers-and-conveyors; 5 pages.

International Search Report; International Application No. PCT/US2017/031852; dated Aug. 16, 2017, 3 pages.

Written Opinion of the International Search Report; International Application No. PCT/US2017/031852; dated Aug. 16, 2017, 9 pages.

* cited by examiner

CONVEYOR SYSTEM, OPERATING SYSTEM USING CONVEYOR SYSTEM, AND METHOD

BACKGROUND

In the drilling and completion industry, the formation of boreholes for the purpose of production or injection of fluid is common. The boreholes are used for exploration or extraction of natural resources such as hydrocarbons, oil, gas, water, and alternatively for CO2 sequestration. To increase the production from a borehole, the production zone can be fractured to allow the formation fluids to flow more freely from the formation to the borehole. The fracturing operation includes pumping fluids at high pressure towards the formation wall to form formation fractures. To retail the fractures in an open condition after fracturing pressure is removed, the fractures must be physically propped open, and therefore the fracturing fluids commonly include solid granular materials, such as sand, generally referred to as proppants.

A conveyor belt system is used to deliver the proppant to a hopper, which subsequently feeds to a blender as needed, for blending with liquids and other additives to form the fracturing fluid. Conveyor systems may also be used to convey solid product chemistries into a blender tub.

Conventional conveyor belts are head driven, meaning the head pulley is powered in order to pull the conveyor portion of the conveyor belt up through the system, because it is easier to pull a conveying portion that is weighted with material than it is to push the conveying portion. These conveyor belts are limited in the angles to which material can be conveyed as material will naturally slide downwardly. To negate some of the effects of gravity, plates are sometimes added along the conveying surface of the conveyor belt to limit the sliding of the material. The length of the conveyor belts may also be adjusted in some conveyor systems.

The art would be receptive to improvements in conveyor systems for bulk materials to add to the flexibility of their use in operational systems.

BRIEF DESCRIPTION

A conveyor system includes a looped belt and a conveying portion cover. The belt has a conveying portion and a retreating portion movable through the conveyor system, each of the conveying portion and the retreating portion having an interior surface and an exterior surface, the exterior surface of the conveying portion configured to convey materials. The conveying portion of the belt is disposed within the conveying portion cover, the retreating portion of the belt disposed exteriorly of the conveying portion cover, and the conveying portion cover has a convex sliding surface and a tubular shape. The interior surface of the conveying portion of the belt is slidable along the sliding surface of the conveying portion cover.

An operating system includes a material receiving member and a conveyor system. The conveyor system includes a looped belt and a conveying portion cover. The belt has a conveying portion and a retreating portion movable through the conveyor system, each of the conveying portion and the retreating portion having an interior surface and an exterior surface, the exterior surface of the conveying portion configured to convey materials. The conveying portion of the belt is disposed within the conveying portion cover, the retreating portion of the belt disposed exteriorly of the conveying portion cover, and the conveying portion cover has a convex sliding surface and a tubular shape. The interior surface of the conveying portion of the belt is slidable along the sliding surface of the conveying portion cover. The conveyor system further includes a discharge portion. Material carried by the conveying portion of the belt is deposited into the material receiving member.

A method of conveying materials using a conveyor system includes: selectively angling a boom of the conveyor system up to approximately 45 degrees with respect to a ground surface; depositing material onto a conveying portion of a conveyor belt of the conveyor system; nesting the conveying portion of the belt and the material into a convex portion of a conveying portion cover; and moving the conveying portion and the material towards a head portion of the conveyor system, wherein the material is retained on the conveying portion due to a cradling action of the convex portion of the conveying portion cover.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
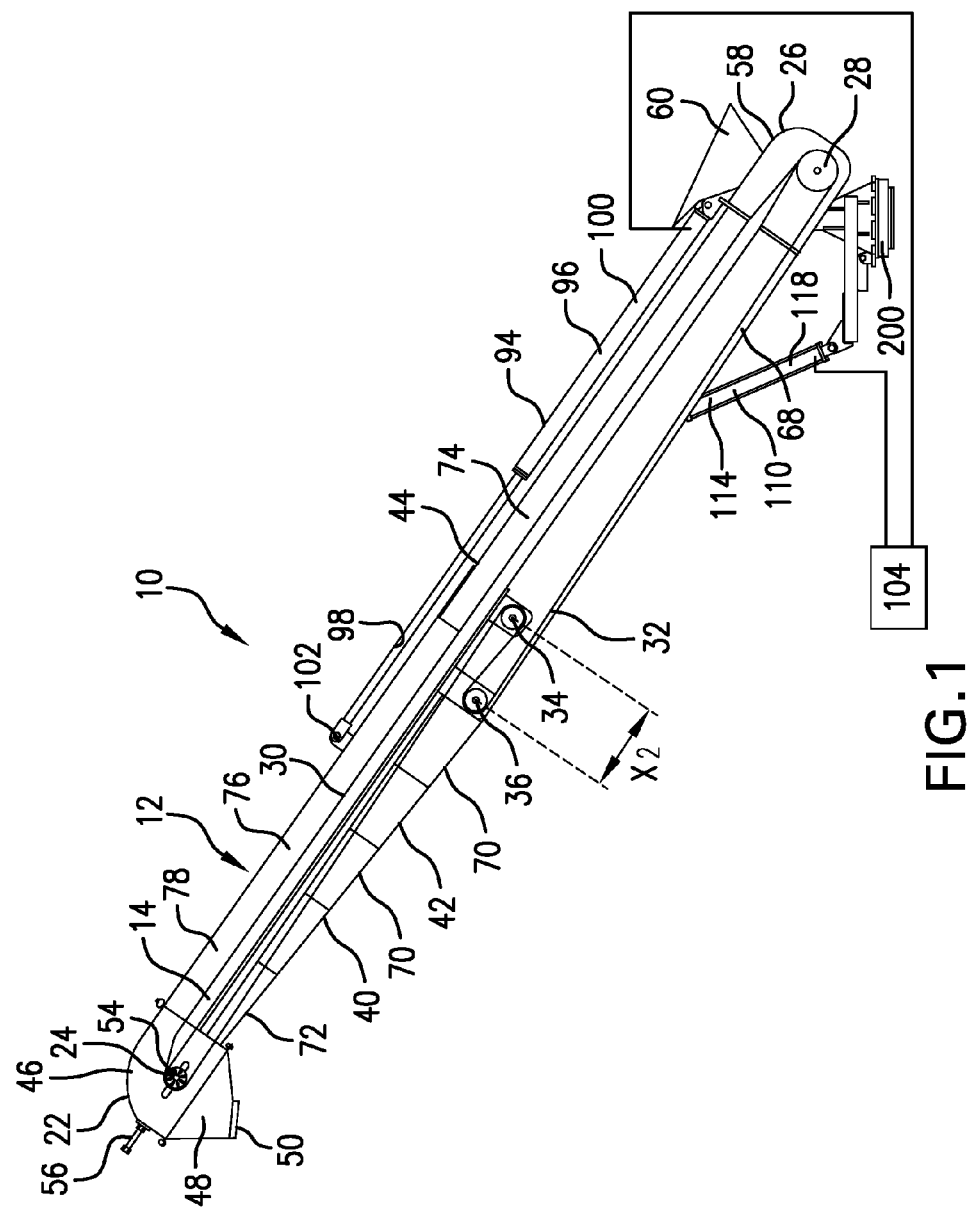
FIG. 1 depicts a sectional view of one embodiment of a conveyor system in an extended condition.
Figure 2:
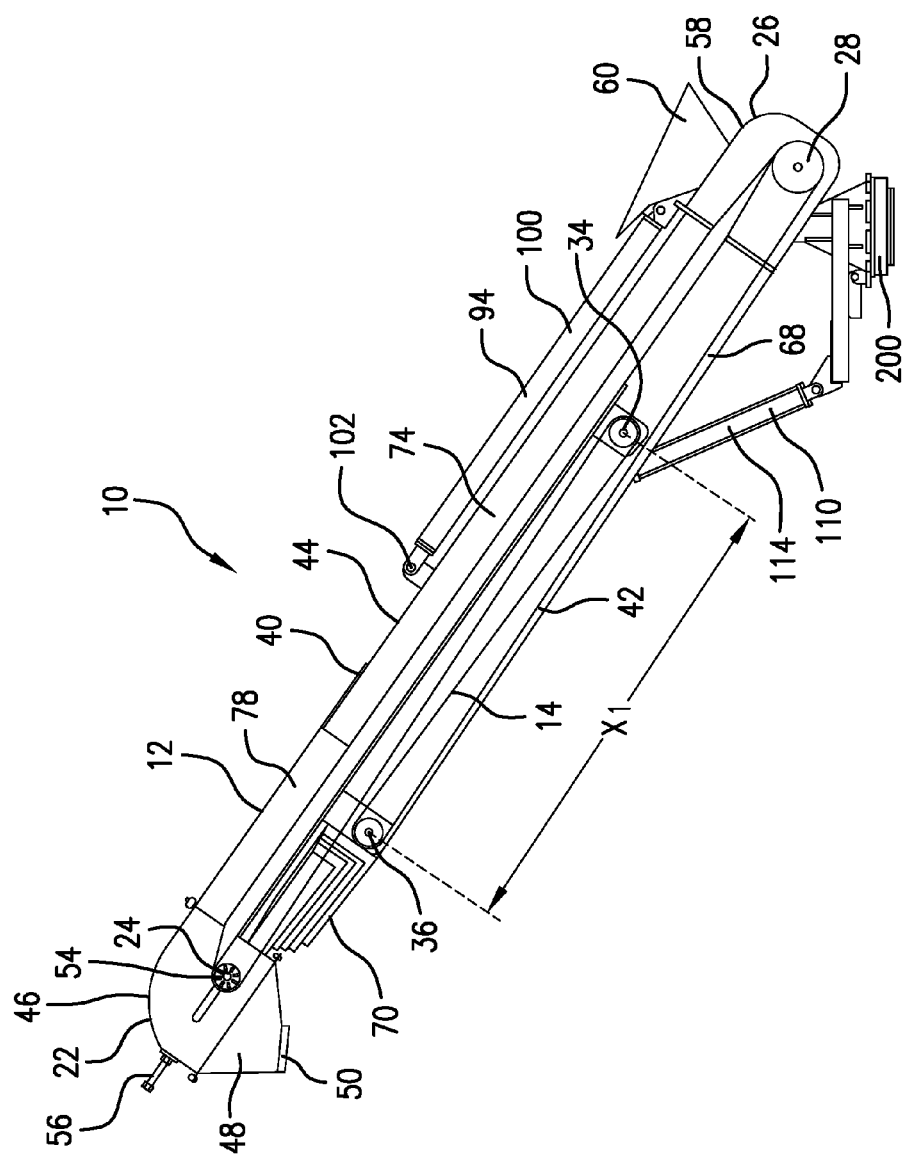
FIG. 2 depicts a sectional view of the conveyor system of FIG. 1 in a contracted condition.
Figure 9:
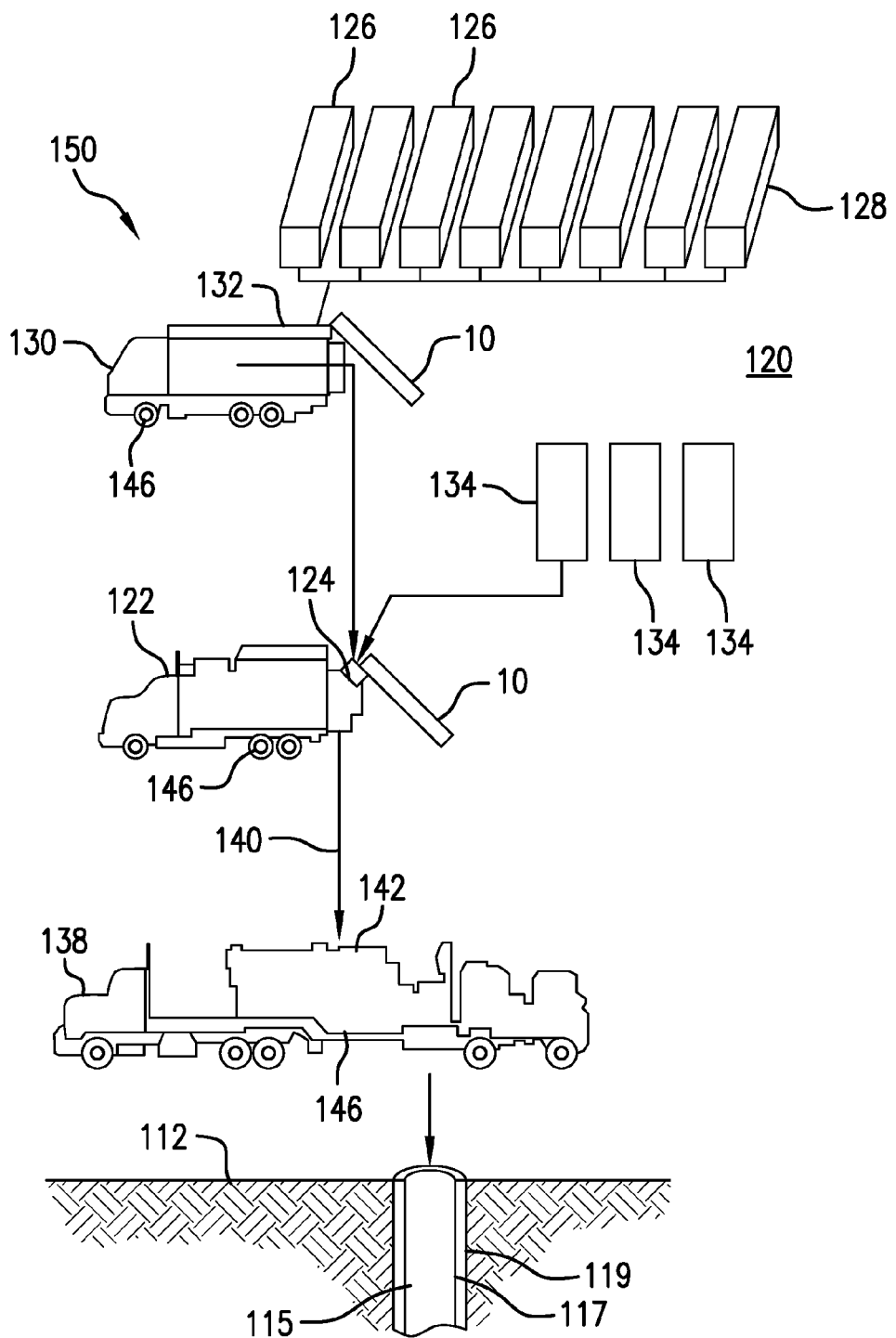
FIG. 9 depicts a schematic view of an embodiment of an operating system usable for a downhole fracturing operation at a wellsite and having an embodiment of the conveyor system.

With reference to FIGS. 1 and 2, a telescoping belt conveyor system 10 in extended and contracted conditions, respectively, is shown. In one non-limiting embodiment, the conveyor system 10 may be used for the addition of bulk solid material 20 (FIG. 3), including but not limited to solid chemicals, directly into a blender tub 124 of a hydraulic fracturing fluid blender 122 for a downhole hydraulic fracturing operation (FIG. 9).

Figure 3:
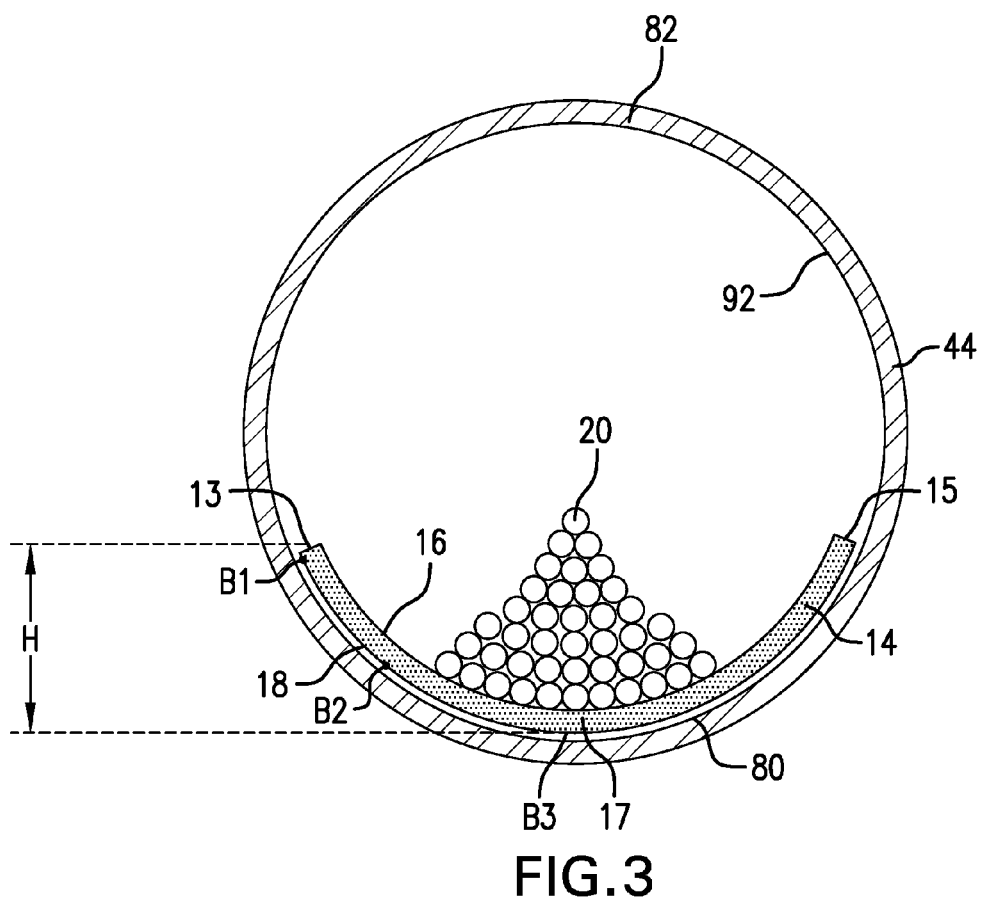
FIG. 3 schematically depicts a cross-section of one embodiment of a conveying portion cover and belt.

A boom 12 of the conveyor system 10 includes a looped belt 14. The belt 14 includes an exterior surface 16 and an interior surface 18 (FIG. 3). The exterior surface 16 may include a chevron pattern (not shown) to assist in conveying material 20. At a head portion 22 of the conveyor system 10, the interior surface 18 of the belt 14 wraps around a head pulley 24. At a tail portion 26 of the conveyor system 10, the interior surface 18 of the belt 14 wraps around a tail pulley 28. The head and tail pulleys 24, 28 have lagging thereon, such as vulcanized rubber, to grip the belt 14. The head and tail pulleys 24, 28 change direction of the belt 14 from conveying to retreating. While the entire belt 14 is capable of both conveying and retreating as it moves about its closed loop path within the conveyor system 10, for the purposes of description, the portion advancing towards the head pulley 24 will be referred to as the conveying portion 30, and the portion retreating from the head pulley 24 will be referred to as the retreating portion 32. While the belt 14 itself has a fixed length, in both conditions, the retreating portion 32 of the belt 14 is longer than the conveying portion 30 of the belt 14. In one embodiment of the conveyor system 10, the retreating portion 32 of the belt 14 is wrapped around at least an additional two pulleys 34, 36, which do not have lagging, for the purpose of taking up the extra length of the retreating portion 32 of the belt 14 between the head and tail pulleys 24, 28. The first pulley 34 is positioned between the tail pulley 28 and the second pulley 36. The second pulley 36 is positioned between the first pulley 34 and the head pulley 24. The belt 14 forms an "S" shape as it travels from the head pulley 24, towards and around the first pulley 34, then towards and around the second pulley 36, then towards the tail pulley 28. In the fully collapsed condition of the conveyor system 10, as shown in FIG. 2, the pulleys 34, 36 are distanced a distance X1 from each other. In the fully expanded condition of the conveyor system 10, as shown in FIG. 1, the pulleys 34, 36 are a distance X2 from each other, significantly shorter than the distance X1. Also, the pulley 36 is closer to the head pulley 24 in the contracted condition than in the extended condition. The separation of the pulleys 34, 36 in the fully expanded condition allows take up of the extra length of the retreating portion 32 of the belt 14 as the boom 12 contracts.

The belt 14 is at least substantially enclosed within the boom 12 by a belt enclosure 40, thus protecting conveyed material 20 on the conveying portion 30 from moisture, debris, and cross-contamination, as well as protecting the retreating portion 32 from the same. In addition to material protection, protection of the surrounding environment from the material 20 is provided by the fully enclosed belt 14. Furthermore, the belt enclosure 40 provides a barrier between personnel in the area and the belt 14, although the belt 14 may be accessed by authorized personnel for maintenance or replacement. The belt enclosure 40 includes the head portion 22, the tail portion 26, a retreating portion cover 42, and a conveying portion cover 44.

The head portion 22 of the belt enclosure 40 includes a head cover 46 arranged to partially surround the head pulley 24. The head portion 22 further includes a discharge portion 48 used to dispense conveyed material 20 from the conveying portion 30 of the belt 14 into a receiving member, such as, but not limited to, a blender 122 for blending a hydraulic fracturing fluid. The discharge mouth 50 may be circular in shape, although other exit shapes are possible. Attached to the head portion 22 is a takeup system 52 (FIGS. 4 and 5), which is configured to allow tensioning of the belt 14 by an operator. In one embodiment, a shaft 54 of the head pulley 24 attaches to the takeup system 52, such that tightening (or loosening) of tensioning devices 56 (e.g., bolts) on opposing sides of the shaft 54 enables tracking of the belt 14, to ensure that the belt 14 runs substantially straight within the enclosure 40, as opposed to tracking to the left or right side of the enclosure 40. Also, the tensioning devices 56 can put tension on the belt 14 to eliminate looseness within the conveyor system 10.

Figure 4:
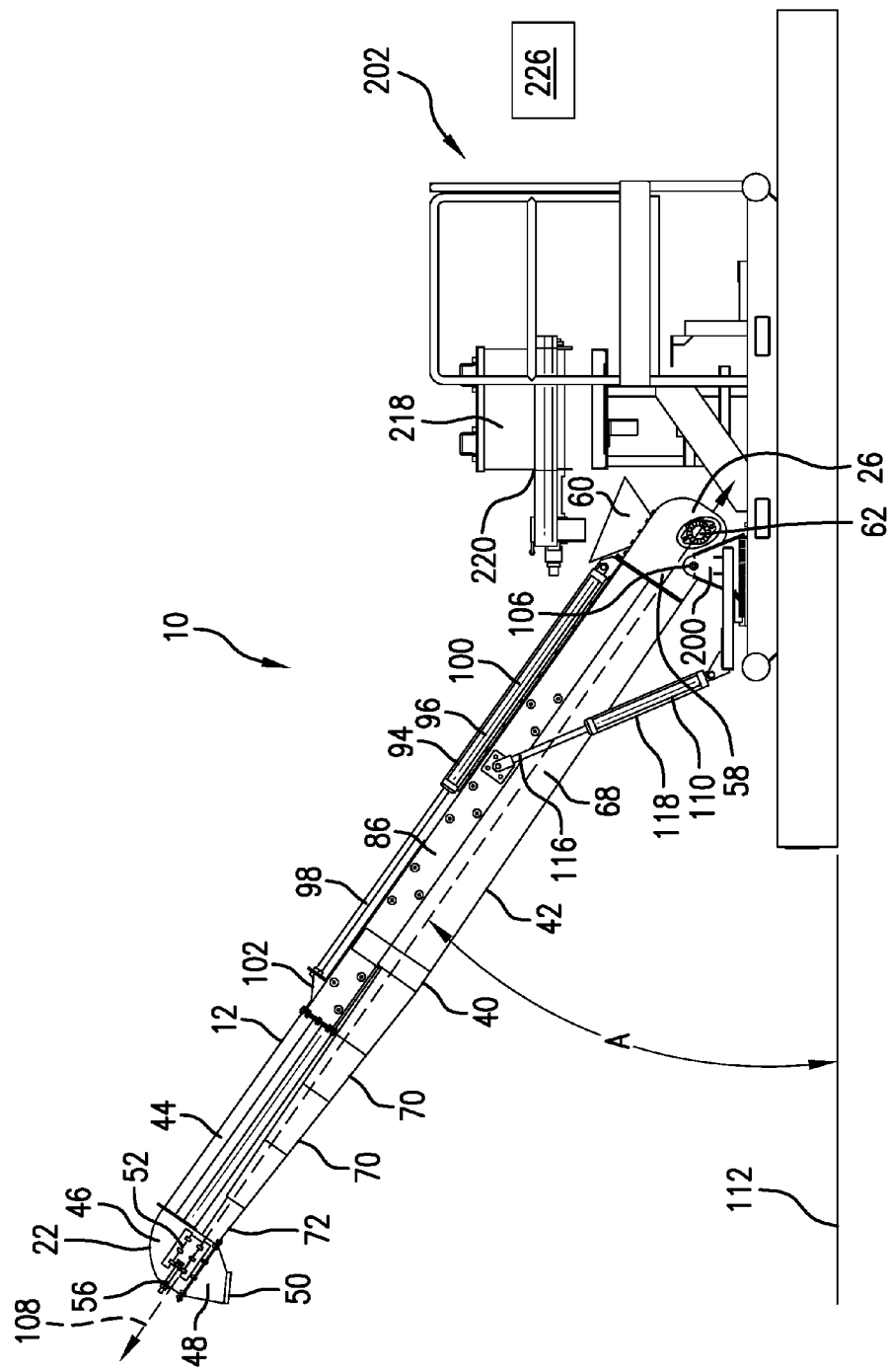
FIG. 4 depicts a side view of one embodiment of the conveyor system and support structure at a first angle.
Figure 5:
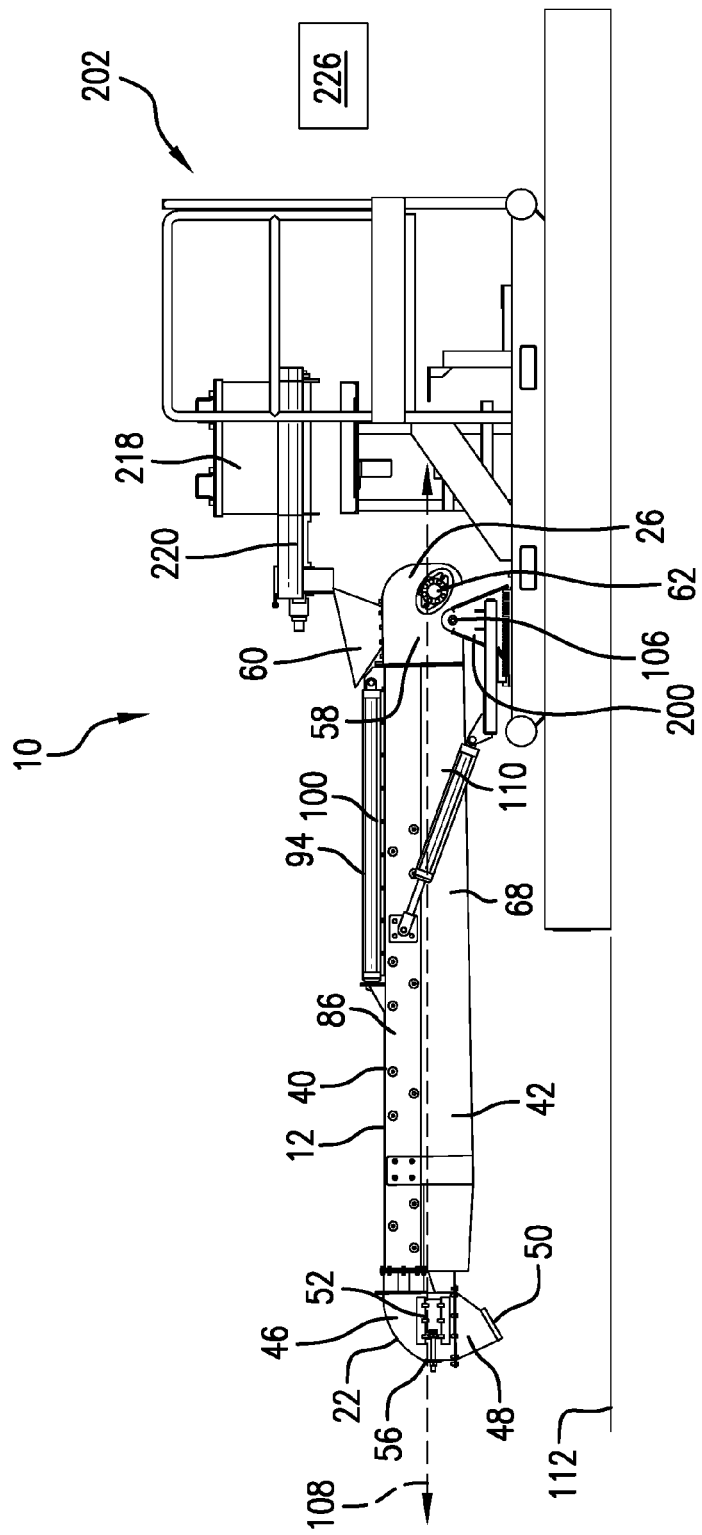
FIG. 5 depicts a side view of the conveyor system of FIG. 4 at a second angle.
Figure 7:
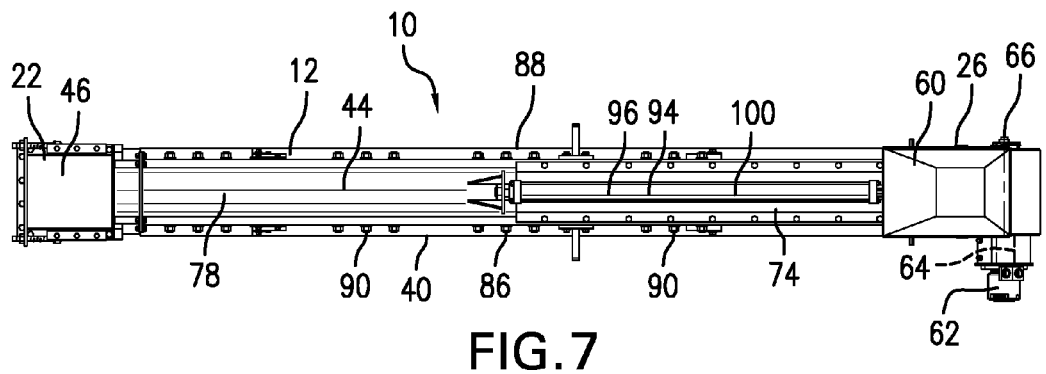
FIG. 7 depicts a top view of the conveyor system of FIG. 1.

The tail portion 26 of the belt enclosure 40 includes a tail cover 58 arranged to partially surround the tail pulley 26. The tail portion 26 further includes a material passage 60, such as a material receiving hopper, where material 20 received within the passage 60 is dropped onto the conveying portion 30 of the belt 14 adjacent the tail pulley 28 for delivery towards the head portion 22 and discharge portion 48. As shown in FIGS. 4, 5, and 7, the tail pulley 28 is driven by motor 62, such that the retreating portion 32 of the belt 14 is pulled towards the tail pulley 28, and the conveying portion 30 of the belt 14 is pushed towards the head pulley 24. In one embodiment, the motor 62 disposed at the tail pulley 28 is attached to a drive coupling 64 (FIG. 7) which directly connects the drive shaft of the motor 62 to the shaft 66 of the tail pulley 28, such that the tail pulley 28 is directly driven by the motor 62 without requiring a gear reducer or other connections between the tail pulley 28 and the motor 62.

The retreating portion cover 42 of the belt enclosure 40 includes a tail end cover portion 68 fixedly attached to the tail portion 26. The retreating portion cover 42 may also include one or more telescoping cover portions 70 nested within each other. A head end cover portion 72 of the retreating portion cover 42 is fixedly attached to the head portion 22. If telescoping cover portions 70 are provided, they are nested between the tail end cover portion 68 and the head end cover portion 72. The head end cover portion 72 is movable away from the tail end cover portion 68 while extending (telescoping) the boom 12 of the conveyor system 10, and is movable towards the tail end cover portion 68 when contracting (collapsing) the boom 12 of the conveyor system 10. The pulleys 34, 36 may be fixed to tubes 74, 78 (further described below) such that the pulleys 34, 36 separate during contraction of the boom 12 for taking up the extra length of the belt 14.

The conveying portion cover 44 of the belt enclosure 40 includes a tail end tube 74 fixedly attached to the tail end cover 58, and at least one movable tube 76 telescopingly arranged relative to the tail end tube 74. In the illustrated embodiment, the at least one movable tube 76 includes a head end tube 78 that is concentric with and overlaps with the tail end tube 74 and is movable with respect to the tail end tube 74. Also in the illustrated embodiment, the tail end tube 74 is nested within the head end tube 78. The head end tube 78 is fixedly attached to the head cover 46 of the belt enclosure 40. The conveyor system 10 is a slider belt system that does not require any idlers to support the belt 14. The conveying portion 30 of the belt 14 is disposed in and supported by the conveying portion cover 44. That is, as depicted in FIG. 3, an interior surface 18 of the conveying portion 30 of the belt 14 is supported by and slidable along a belt supporting surface 80 (a lower side) of the conveying portion cover 44, and an exterior surface 16 of the conveying portion 30 of the belt 14, and any material 20 carried thereon, is covered by a covering surface 82 (an upper side) of the conveying portion cover 44. The belt supporting surface 80 is convex in shape such that the belt 14 is cupped by the belt supporting surface 80. The belt 14 is nested on the belt supporting surface 80, such that the belt 14 takes on an at least substantially continuously convex shape from a first side 13 to a second side 15 of the belt 14, when passing through the conveying portion cover 44. Further, in one embodiment of the belt 14, in a cross-section of the belt 14 within the conveying portion 30, a height H of the belt 14 decreases substantially continuously from the first and second sides 13, 15 to a central portion 17 of the belt 14, thus the belt 14 is cradled within the belt supporting surface 80.

For example, a height of the belt 14 at point B1 is greater than a height of the belt 14 at point B2, which is greater than a height of the belt 14 at point B3. The conveying portion cover 44 may have a circular cross-section as shown, such that the belt supporting surface 80 has a cross-sectional shape of an arc of a circle. The belt supporting surface 80 of the conveying portion cover 44 is configured for cupping the conveyed material 20 along at least substantially an entire width of the conveying portion 30 of the belt 14. The conveying portion 30 of the belt 14 therefore includes, in one embodiment, a curved cross-section with no planar portions. The retreating portion 32 of the belt 14, as compared to the conveying portion 30, is flat, and no cupping is required since material 20 is not conveyed on the retreating portion 32. Although the belt 14 may have a constant thickness, as depicted in FIGS. 1 and 2, the sectional view of the belt 14 depicts more of the belt 14 in the conveying portion 30 than in the retreating portion 32 due to the curvature of the conveying portion 30.

The conveyor system 10 may further include first and second side supports 86, 88 on opposing sides of the tail end tube 74 and at least a portion of the head end tube 78. The first and second side supports 86, 88 may attach to the tail end tube 74, as well as the tail end cover portion 68 of the retreating portion cover 42. Rollers 90 (FIG. 7) are positioned between the first and second side supports 86, 88 and on each side of the head end tube 78 to act as a guide as the conveyor system 10 extends and contracts. The rollers 90 support the head end tube 78 to provide smooth transition as the head end tube 78 moves with respect to the tail end tube 74. The rollers 90 do not come in contact with the belt 14, as only the interior surface 92 of the conveying portion cover 44 comes in contact with the conveying portion 30 of the belt 14.

A length-controlling actuator 94 is provided within the conveyor system 10 for extending and contracting the belt enclosure 40, thus extending and contracting a length of the looped belt 14 enclosed therein. In one embodiment, the actuator 94 includes a hydraulic cylinder 96. The hydraulic cylinder 96 includes a piston 98 slidable within a piston chamber 100. The piston 98 is attached to the head end tube 78 (or to an intervening telescoping tube), such as by a pusher 102 or other connection feature. The pusher 102 may, in one embodiment, be a metal bracket to which the piston 98 attaches to push the head end tube 78. The piston chamber 100 is connected to a hydraulic circuit system 104, schematically shown in FIG. 1, that provides hydraulic power to the conveyor system 10. Hydraulic fluid is supplied to the piston chamber 100 for operation. When extension of the boom 12 is desired, hydraulic pressure supplied to the piston chamber 100 forcing the piston 98 to move exteriorly of the chamber 100. Movement of the piston 98 also moves the pusher 102 and the connected head end tube 78. As the head end tube 78 moves, the attached head cover 46 also moves, as does the attached head end cover portion 72 of the retreating portion cover 42. Thus, the head end cover portion 72 as well as any telescoping cover portions 70 will telescope away from the tail end cover portion 68. The amount of extension of the boom 12 depends on the amount of hydraulic pressure applied to the piston chamber 100 of the hydraulic cylinder 96. Relieving the hydraulic pressure within the piston chamber 100, and/or alternatively applying pressure to an opposite side of the piston chamber 100, will draw or force the piston 98 back into the piston chamber 100, thus contracting the boom 12 into the position shown in FIG. 2, or to a selected position between the fully extended condition shown in FIG. 1 and the contracted condition shown in FIG. 2.

The boom 12 of the conveyor system 10 is also angularly positionable about a pivot axis 106 (FIGS. 4 and 5). The boom 12, having a longitudinal axis 108 along which the boom can extend and retract, may be positioned substantially parallel to the ground surface 112 (FIG. 5). In one embodiment, this may also correspond to a "closed" condition of the conveyor system 10, such as if the material passage 60 is angled away from a source of material 20. An angle-controlling actuator 110 may be used to change the angle of the boom 12 with respect to the ground surface 112, such as approximately 45 degrees from the ground surface 112, or any angle in between 0 degrees and approximately 45 degrees. As with the length-controlling actuator 94 of the conveyor system 10, the angle-controlling actuator 110 may include, in one embodiment, a hydraulic cylinder 114. In the illustrated embodiment, a pair of hydraulic cylinders 114 is connected to opposing sides of the boom 12, such as connected to the first and second side supports 86, 88. The hydraulic cylinders 114 may each include a piston 116 slidable within a piston chamber 118, best seen in FIG. 4. The pistons 116 may be attached to the first and second side supports 86, 88, while the piston chambers 118 are connected to the hydraulic system 104. Hydraulic fluid is supplied to the piston chambers 118 for operation. When an increased angle of the boom 12 is desired, hydraulic pressure is supplied to the piston chambers 118 forcing the pistons 116 to move exteriorly of the chambers 118. Movement of the pistons 116 forces the boom 12 to increase the angle A between the longitudinal axis 108 and the ground 112. The amount of angle change of the boom 12 depends on the amount of hydraulic pressure applied to the piston chambers 118 of the hydraulic cylinders 114. Relieving the hydraulic pressure within the piston chambers 118, and/or applying pressure to an opposite end of the piston chambers 118, will draw or force the pistons 116 back into the piston chambers 118, thus lowering the head portion 22 of the boom 12 towards the ground 112, such as shown in FIG. 5, or to a selected position between the angle A shown in FIG. 4 and the substantially parallel position shown in FIG. 5.

In one embodiment, the hydraulic cylinders 96, 114 are all hydraulically driven off of the same hydraulic circuit system 104, which may be a pressure compensated hydraulic system, or an open or closed loop system. That is, the system may be supplied with a set level of pressure (such as, but not limited to, approximately 2,000 psi), and the hydraulic components on the conveyor system 10, including the hydraulic cylinders 96, 114, may all draw from the same pressure level for operation.

Figure 6:
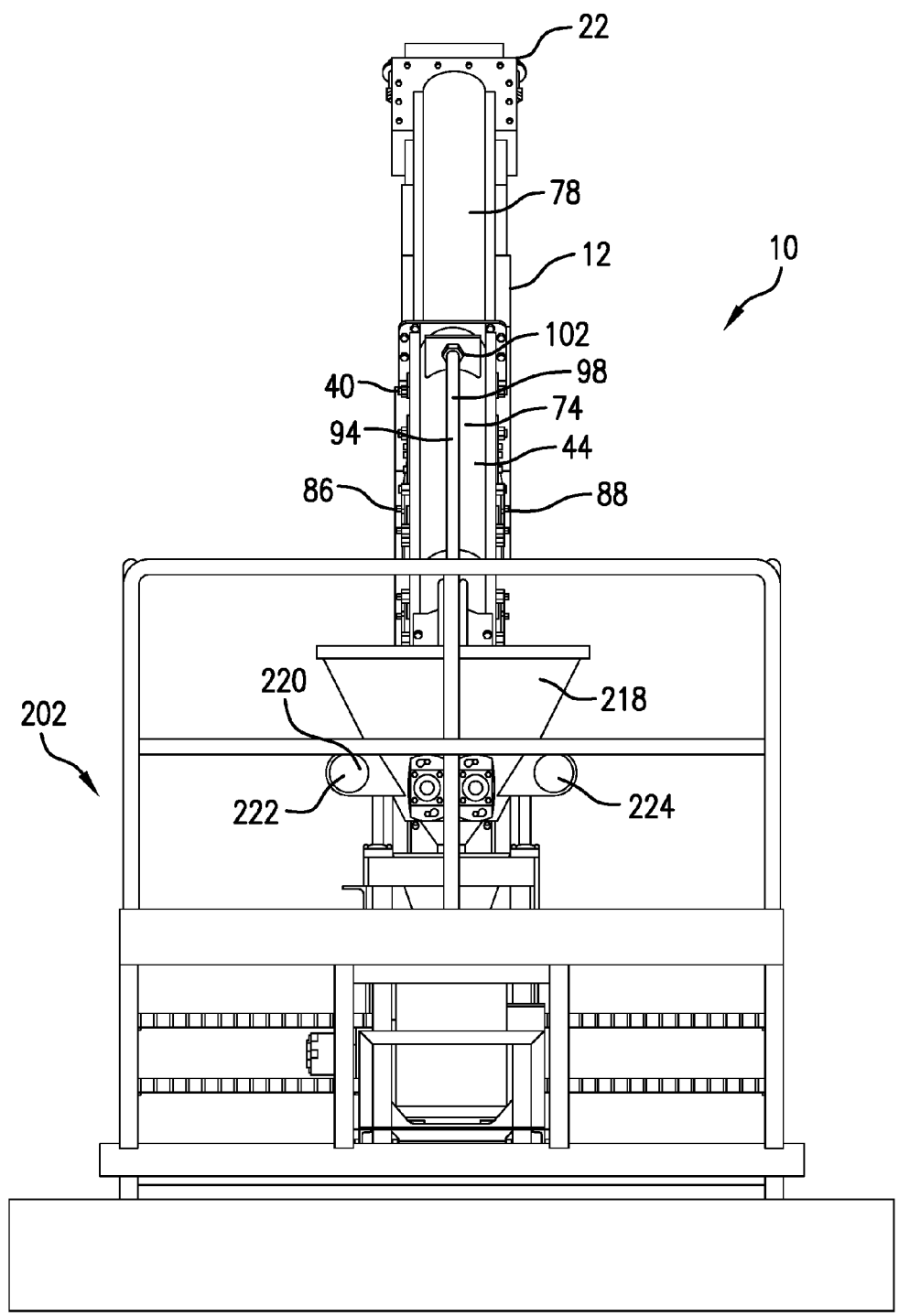
FIG. 6 depicts a rear view of the conveyor system of FIG. 4 with the conveyor system at the first angle.
Figure 8:
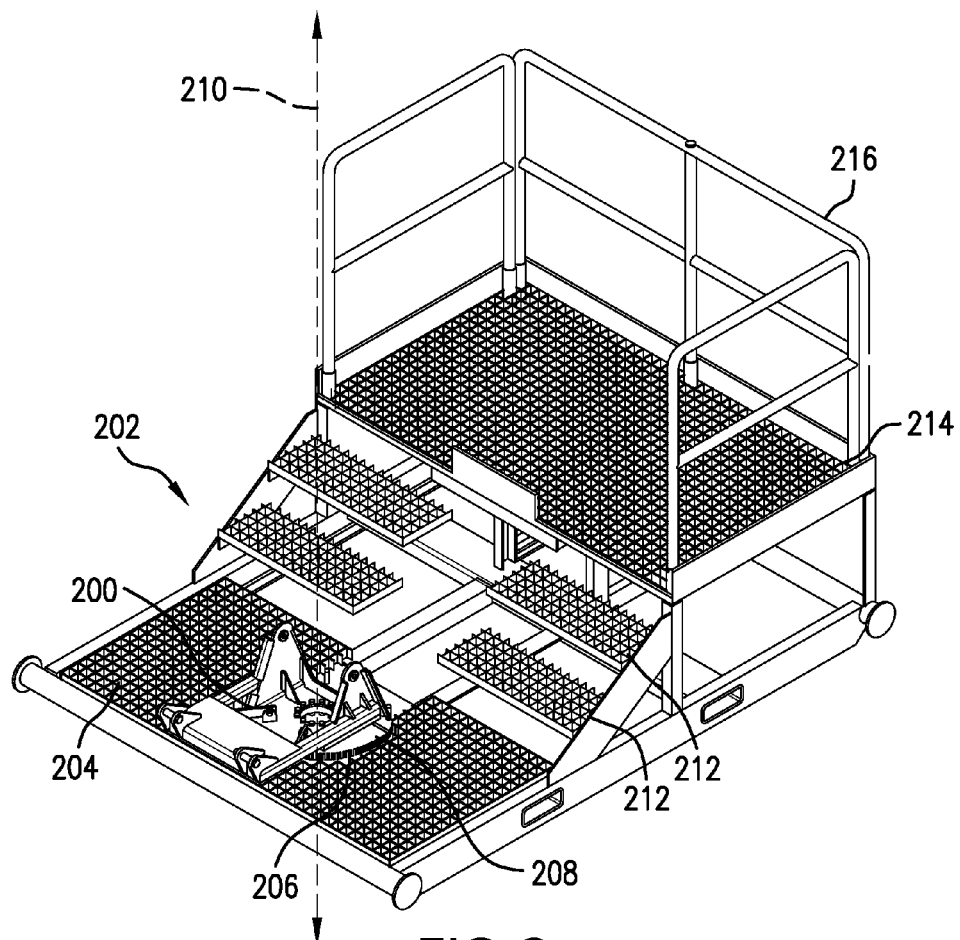
FIG. 8 depicts a perspective view of the support structure of FIG. 4.

The conveyor system 10 may also include a swivel base 200 to which the boom 12 is attached and rotatable with. A support structure 202 of the conveyor system 10 includes a platform 204 (FIG. 8) having an aperture 206 for receiving a bearing 208 of the swivel base 200. The bearing 208 mounts through the aperture 206, and is rotatable therein, allowing the swivel base 200 and boom 12 of the conveyor system 10 to rotate with respect to the platform 204 and support structure 202, at least a full 180 degrees about axis 210 that passes through a center of the bearing 208. In one embodiment, such a rotation may be manual by either pushing or pulling the boom 12 in the desired direction by hand, which limits the amount of automatic features that could break down, less moving parts, and no need for electricity or hydraulic horsepower to actuate the rotation of the boom 12 about the axis 210. The support structure 202 may further include stairs 212 and a landing 214 for an operator. The landing 214 may be partially surrounded about its perimeter by rails 216. As shown in FIGS. 4-6, the support structure 202 may further receive a storage and dispensing container 218 for material 20. The landing 214 for the operator may be at a height that allows the operator easy access to the container 218.

In one embodiment, the storage and dispensing container 218 is a dry additive feeder 220 configured to feed material 20 into the passage 60. The feeder 220 may include one or more distinct compartments therein for receiving one or more distinct materials therein. For example, the feeder 220 may include first and second (left and right) sides, in which first and second feeds 222, 224 (FIG. 6) from those sides are separately adjustable to selectively dispense into the passage 60. For example, a first material may be fed into the passage 60 at a faster or slower rate than the second material. The conveyor system 10 may be controlled by a controller 226, shown schematically in FIGS. 4 and 5, having a computer system such that whatever feed speeds are used, the speed of the belt 14, via motor 62, is made to speed up or slow down. Conveyor speed can be automatically or manually ramped up or down based on the feed rate of the one or more feeders 222, 224. In one embodiment, the rate of the conveyor system 10, and any other controllable feature within the conveyor system 10, can be controlled remotely using a monitoring software application within the controller 226, such as Jobmaster™ software from Baker Hughes Inc. In one embodiment, the speed of the belt 14 will be such that the material conveying rate of the belt 14 is greater than the combined metering rate of the feeders 222, 224.

The conveyor system 10 may be trailer mounted or mounted on the ground. Although alternate sizes may be accommodated, in one embodiment, the boom 12 may have a compressed length of approximately 12 feet and a fully extended and telescoped length of approximately 16 feet.

With reference now to FIG. 9, the conveyor system 10 is depicted at a location within an operation system 150. In the illustrated embodiment, the location is a wellsite 120 and the operation system 150 is for a hydraulic fracturing operation. While the conveyor system 10 may be used in a number of different manufacturing and industry environments, the conveyor system 10 is particularly suited for use in a hydraulic fracturing operation for pumping a fluid from a surface 112 to a borehole 115, such as a hydraulic fracturing fluid. The borehole 115 may be cased or uncased, or include any other tubular 117 provided with perforations or openings for fracturing fluid to pass towards the formation wall 119. The operation system 150 (a fluid processing system) includes a blender 122. The blender 122 includes, in part, a blender tank or tub 124 for blending components of the fracturing fluid. Components of the fracturing fluid may include a base fluid (such as water), proppant, and various other additives to form a slurry of the hydraulic fracturing fluid. The base fluid may be stored in one or more water tanks 126 in a fluid supply 128. In one embodiment, prior to blending, the base fluid may be passed through a hydration system 130, which combines the base fluid with additives for a sufficient amount of residence time within a hydration tank 132 of the hydration system 130 to form a gel. In one embodiment, the additives may be deposited therein using conveyor system 10. The gel from the hydration tank 132 may then be directed to the blender 122 for combining with bulk materials, such as proppants, stored in silos 134, which may be positioned to dispense the bulk materials on a conveyor belt for selectively providing the blender 122 with the bulk material. The conveyor system 10 may be used for directing material either into the hydration system 130 or into the blender 122. The conveyor system 10 enables the application of materials, such as solid production chemistries, directly to the blender tub 124 and/or hydration tank 132 or other material receiving member, and can be used for a multitude of dry chemical additives directly into the blender tub 124 and/or hydration tank 132 or other material receiving member with precise metering capabilities. The fracturing fluid is pumped from the blender 122 to a fracturing pump assembly 138 along flow line 140. The fracturing pump assembly 138 may include one or more fracturing pumps 142 (also known as "frac" pumps). While only one fracturing pump assembly 138 is depicted, a manifold may provide the fracturing fluid to multiple fracturing pump assemblies 138. The hydraulic fracturing fluid is then deliverable into the borehole 115 at high pressures by the one or more fracturing pump assemblies 138.

Any or all of the components of the system 150, including the blender 122, hydration system 130, conveyor system 10, fluid supply 128, and fracturing pump assembly 138 may be provided on trailer beds, trucks, or other movable/wheeled platform or transportable surface 146 to assist in delivery of the components to the well site 120, and to enable such components to be reconfigured as needed at the wellsite 120, and quickly removed from the well site 120 when the process is completed. Alternatively, in an embodiment where the system 150 is utilized for an offshore well, the components may be positioned on a suitable fracturing and stimulation vessel (not shown). In one embodiment, the conveyor system 10 may be skid mounted with remote hydraulics.

In one non-limiting example of an application of the conveyor system 10, the conveyor system 10 may be used to transport material 20 at up to approximately 200 pounds per minute (7 cubic feet/min) at a 45 degree angle, with a material 20 weighing approximately 50 to approximately 200 pounds per cubic foot. While 45 degrees is steep angle to convey material 20, the nestling/cupping of the belt 14 within the tubes 74, 78 of the conveying portion cover 44 supports the conveying portion 30 of the belt 14 so that the conveyed material 20 is not only cupped by the belt 14, but also pushed in closer proximity to other portions of the material 20. The conveyor system 10 telescopes by moving the longitudinally extendable head end tube 78 (which may be a pipe) with respect to the fixed tail end tube 74 (which may be another pipe), where the tubes 74, 78 have different diameters for telescoping with respect to each other. By "fixed" it should be understood that this refers to the lack of extendability of the tail end tube 74, rather than the angle. That is, the fixed tail end tube 74 is able to move with the system to the selected angle about pivot axis 106, and able to rotate with respect to the support structure 202 about the axis 210, but is not able to extend along longitudinal axis 108. The pipe shape of the tubes 74, 78 provide for cupping of the belt 14, to better hold the material 20 in place than a flat belt, ultimately allowing for greater usable angles of the conveyor system 10. That is, the conveyor system 10 can hold the material 20 in place with no additional moving parts, thus allowing the conveyor system 10 to convey material 20 at steeper angles, such as up to 45 degrees. Further, the material 20 is conveyed within an at least substantially enclosed belt enclosure 40 providing protection from the environment and affording protection to the environment.

Set forth below are some embodiments of the foregoing disclosure:

Embodiment 1: A conveyor system including a looped belt and a conveying portion cover. The belt having a conveying portion and a retreating portion movable through the conveyor system, each of the conveying portion and the retreating portion having an interior surface and an exterior surface, the exterior surface of the conveying portion configured to convey materials. The conveying portion of the belt disposed within the conveying portion cover, the retreating portion of the belt disposed exteriorly of the conveying portion cover, the conveying portion cover having a convex sliding surface and a tubular shape. The interior surface of the conveying portion of the belt is slidable along the sliding surface of the conveying portion cover.

Embodiment 2: The conveyor system of any of the preceding embodiments, wherein the convex sliding surface is curved.

Embodiment 3: The conveyor system of any of the preceding embodiments, wherein the convex sliding surface has a cross-sectional shape of an arc of a circle.

Embodiment 4: The conveyor system of any of the preceding embodiments, wherein the conveying portion cover has at least a substantially circular cross-section.

Embodiment 5: The conveyor system of any of the preceding embodiments, wherein at least a substantial portion of the interior surface of the conveying portion contacts the sliding surface, and the conveying portion is nested within the conveying portion cover.

Embodiment 6: The conveyor system of any of the preceding embodiments, wherein the conveying portion of the belt has a convex cross-section.

Embodiment 7: The conveyor system of any of the preceding embodiments, wherein the conveyor system is telescopic.

Embodiment 8: The conveyor system of any of the preceding embodiments, wherein the conveying portion cover includes at least a head end tube telescopically arranged with respect to a tail end tube.

Embodiment 9: The conveyor system of any of the preceding embodiments, further comprising a telescopic retreating portion cover, the retreating portion of the belt disposed within the retreating portion cover.

Embodiment 10: The conveyor system of any of the preceding embodiments, further comprising a hydraulic cylinder attached to the head end tube, the hydraulic cylinder including a piston arranged to selectively move the head end tube towards and away from the tail end tube.

Embodiment 11: The conveyor system of any of the preceding embodiments, wherein the belt and the conveying portion cover are included within a boom of the conveyor system, and further comprising an actuator arranged to selectively angle the boom to a position approximately 45 degrees with respect to a ground surface.

Embodiment 12: The conveyor system of any of the preceding embodiments, further comprising a head pulley, a tail pulley, and a motor arranged to drive the tail pulley, wherein the conveying portion of the belt is movable from the tail pulley to the head pulley.

Embodiment 13: The conveyor system of any of the preceding embodiments, further comprising a direct drive coupling between the motor and the tail pulley.

Embodiment 14: The conveyor system of any of the preceding embodiments, further comprising a head pulley, a tail pulley, and first and second separable pulleys, the conveying portion of the belt movable from the tail pulley to the head pulley and the retreating portion of the belt movable from the head pulley to the tail pulley, and the first and second separable pulleys arranged to engage with the retreating portion of the belt.

Embodiment 15: The conveyor system of any of the preceding embodiments, further comprising a swivel base attached to a tail portion of the conveyor system, and a supporting structure, wherein a boom of the conveyor system is pivotal at least 180 degrees with respect to the supporting structure.

Embodiment 16: An operating system including a material receiving member; and, the conveyor system of any of the preceding embodiments, the conveyor system further including a discharge portion; wherein material carried by the conveying portion of the belt is deposited into the material receiving member.

Embodiment 17: The operating system of any of the preceding embodiments, wherein the material receiving member is one of a blender tub, a mixing tub, and a tank.

Embodiment 18: The operating system of any of the preceding embodiments, wherein the material is a bulk solid material for a hydraulic fracturing fluid.

Embodiment 19: The operating system of any of the preceding embodiments, further comprising a blender and a high pressure fracturing pump configured to receive the hydraulic fracturing fluid from the blender.

Embodiment 20: A method of conveying materials using a conveyor system includes: selectively angling a boom of the conveyor system up to approximately 45 degrees with respect to a ground surface; depositing material onto a conveying portion of a conveyor belt of the conveyor system; nesting the conveying portion of the belt and the material into a convex portion of a conveying portion cover; and, moving the conveying portion and the material towards a head portion of the conveyor system, wherein the material is retained on the conveying portion due to a cradling action of the convex portion of the conveying portion cover.

Embodiment 21: The method of any of the preceding embodiments, further comprising telescoping the boom, including telescoping a head end tube with respect to a tail end tube of the conveying portion cover.

Embodiment 22: The method of any of the preceding embodiments, wherein the conveying portion cover has at least a substantially circular cross-section.

Embodiment 23: The method of any of the preceding embodiments, wherein the conveyor system is portable, the method further comprising arranging the conveyor system at a wellsite and transmitting additives from a metering feeder to at least one of a blender and a hydration system using the conveyor system.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An operating system comprising:
   a material receiving member including a blender;
   a high pressure fracturing pump configured to receive hydraulic fracturing fluid from the blender; and
   a conveyor system including:
      a head portion;
      a tail portion;
      a looped belt having a conveying portion and a retreating portion movable through the conveyor system, each of the conveying portion and the retreating portion having an interior surface and an exterior surface, the exterior surface of the conveying portion configured to convey materials;
      a conveying portion cover extending from the tail portion to the head portion of the conveyor system, the conveying portion of the belt disposed within the conveying portion cover, the retreating portion of the belt disposed exteriorly of the conveying portion cover from the head portion to the tail portion, the conveying portion cover having a convex sliding surface from the tail portion to the head portion and a tubular shape from the tail portion to the head portion; and
      a discharge portion;
   wherein the interior surface of the conveying portion of the belt is slidable along the sliding surface of the conveying portion cover from the tail portion to the head portion of the conveyor system, at least a substantial portion of the interior surface of the conveying portion of the belt contacting the sliding surface of the conveying portion cover, the conveying portion of the belt being nested within the conveying portion cover, and the conveyor system is telescopic; and material carried by the conveying portion of the belt is deposited into the material receiving member.

2. The operating system of claim 1, wherein the convex sliding surface is curved.

3. The operating system of claim 2, wherein the convex sliding surface has a cross-sectional shape of an arc of a circle.

4. The operating system of claim 1, wherein the conveying portion cover has at least a substantially circular cross-section.

5. The operating system of claim 1, wherein the conveying portion of the belt has a convex cross-section.

6. The operating system of claim 1, wherein the conveying portion cover includes at least a head end tube telescopically arranged with respect to a tail end tube.

7. The operating system of claim 6, further comprising a telescopic retreating portion cover, the retreating portion of the belt disposed within the retreating portion cover.

8. The operating system of claim 6, further comprising a hydraulic cylinder attached to the head end tube, the hydraulic cylinder including a piston arranged to selectively move the head end tube towards and away from the tail end tube.

9. The operating system of claim 1, wherein the belt and the conveying portion cover are included within a boom of the conveyor system, and further comprising an actuator arranged to selectively angle the boom to a position approximately 45 degrees with respect to a ground surface.

10. The operating system of claim 1, further comprising a head pulley, a tail pulley, and a motor arranged to drive the tail pulley, wherein the conveying portion of the belt is movable from the tail pulley to the head pulley.

11. The operating system of claim 10, further comprising a direct drive coupling between the motor and the tail pulley.

12. The operating system of claim 1, further comprising a head pulley, a tail pulley, and first and second separable pulleys, the conveying portion of the belt movable from the tail pulley to the head pulley and the retreating portion of the belt movable from the head pulley to the tail pulley, and the first and second separable pulleys arranged to engage with the retreating portion of the belt.

13. The operating system of claim 1, further comprising a swivel base attached to the tail portion of the conveyor system, and a supporting structure, wherein a boom of the conveyor system is pivotal at least 180 degrees with respect to the supporting structure.

14. The operating system of claim 1, wherein the blender includes a blender tub, and the operating system further includes a hydration system having a tank.

15. The operating system of claim 1, wherein the material is a bulk solid material for the hydraulic fracturing fluid.

16. A method of conveying materials using the operating system of claim 1, the method comprising:
   selectively angling a boom of the conveyor system up to approximately 45 degrees with respect to a ground surface;
   depositing material onto the conveying portion of the belt of the conveyor system;
   nesting the conveying portion of the belt and the material into convex sliding surface of the conveying portion cover; and,
   moving the conveying portion and the material towards the head portion of the conveyor system, wherein the material is retained on the conveying portion due to a cradling action of the convex sliding surface of the conveying portion cover.

17. The method of claim 16, further comprising telescoping the boom, including telescoping a head end tube with respect to a tail end tube of the conveying portion cover.

18. The method of claim 16, wherein the conveying portion cover has at least a substantially circular cross-section.

19. A method of conveying materials using a portable conveyor system, the method comprising:
- arranging the conveyor system at a wellsite;
- selectively angling a boom of the conveyor system up to approximately 45 degrees with respect to a ground surface;
- depositing material onto a conveying portion of a conveyor belt of the conveyor system;
- nesting the conveying portion of the belt and the material into a convex portion of a conveying portion cover;
- moving the conveying portion and the material towards a head portion of the conveyor system, wherein the material is retained on the conveying portion due to a cradling action of the convex portion of the conveying portion cover; and,
- transmitting additives from a metering feeder to at least one of a blender and a hydration system using the conveyor system.

\* \* \* \* \*